United States Patent
Kondo et al.

(10) Patent No.: US 11,927,237 B2
(45) Date of Patent: Mar. 12, 2024

(54) VIBRATION ISOLATION DEVICE WITH BRACKET

(71) Applicant: Sumitomo Riko Company Limited, Aichi (JP)

(72) Inventors: Hiroki Kondo, Aichi (JP); Kenji Oki, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 536 days.

(21) Appl. No.: 17/165,978

(22) Filed: Feb. 3, 2021

(65) Prior Publication Data

US 2021/0156452 A1    May 27, 2021

Related U.S. Application Data

(63) Continuation of application No. PCT/JP2019/049657, filed on Dec. 18, 2019.

(30) Foreign Application Priority Data

Mar. 26, 2019  (JP) ................. 2019-058920

(51) Int. Cl.
  *F16F 13/10* (2006.01)
  *B60K 5/12* (2006.01)
  *F16F 15/08* (2006.01)

(52) U.S. Cl.
  CPC ............ *F16F 15/08* (2013.01); *B60K 5/1208* (2013.01); *F16F 2224/025* (2013.01); *F16F 2230/0005* (2013.01)

(58) Field of Classification Search
  CPC ............... F16F 15/08; F16F 2224/025; F16F 2230/0005; F16F 15/085; F16F 13/08; F16F 13/103–106; B60K 5/1208

(Continued)

(56) References Cited

U.S. PATENT DOCUMENTS 9,593,732 B2   3/2017  Thierry et al.
9,739,333 B2   8/2017  Michiyama et al.
(Continued)

FOREIGN PATENT DOCUMENTS

JP      5083405      11/2012
JP    2016109216      6/2016
(Continued)

OTHER PUBLICATIONS

"Written Opinion of the International Searching Authority (Form PCT/ISA/237) of PCT/JP2019/049657," dated Feb. 18, 2020, with English translation thereof, pp. 1-11.
(Continued)

*Primary Examiner* — Christopher P Schwartz
(74) *Attorney, Agent, or Firm* — JCIPRNET (57) ABSTRACT

A vibration isolation device with bracket includes a first attachment member and a second attachment member coupled by a main body rubber elastomer. The second attachment member has a frame shape with a through hole. The main body rubber elastomer is fastened to an upper surface side of the second attachment member. The main body rubber elastomer penetrates to a lower surface side of the second attachment member through the through hole. A holding rubber is formed integrally with the main body rubber elastomer on a lower surface of fitting portions of the second attachment member. A fixed surface is arranged on an upper surface of the fitting portions. The fixed surface is exposed by the main body rubber elastomer, directly superimposed on an inner surface of the fitting grooves, and pressed and fixed by static friction to the inner surface of the fitting grooves by the holding rubber.

4 Claims, 5 Drawing Sheets

(58) Field of Classification Search
USPC ............... 267/140.11–140.15, 140.2–140.5,
267/141.1–141.7
See application file for complete search history.

(56) References Cited

U.S. PATENT DOCUMENTS

| | | | | |
|---|---|---|---|---|
| 9,931,923 | B2 | 4/2018 | Oki et al. | |
| 9,982,745 | B2 | 5/2018 | Kanaya et al. | |
| 10,415,665 | B2* | 9/2019 | Goto | F16F 13/103 |
| 10,906,384 | B2* | 2/2021 | Kadowaki | F16F 1/3849 |
| 11,454,295 | B2* | 9/2022 | Kondo | B60K 5/12 |
| 2017/0335920 | A1* | 11/2017 | Kanaya | B60K 5/1208 |
| 2020/0217391 | A1* | 7/2020 | Kadowaki | B60K 5/1208 |
| 2022/0065325 | A1* | 3/2022 | Tanaka | F16F 13/108 |
| 2022/0297525 | A1* | 9/2022 | Oki | F16F 15/08 |

FOREIGN PATENT DOCUMENTS

| | | |
|---|---|---|
| JP | 2017082991 | 5/2017 |
| JP | 2017207189 | 11/2017 |
| JP | 2017214968 | 12/2017 |
| JP | 2017219180 | 12/2017 |
| JP | 6479523 | 3/2019 |

OTHER PUBLICATIONS

"Office Action of Japan Counterpart Application" with English translation thereof, dated Jul. 15, 2022, p. 1-p. 6.
"Office Action of China Counterpart Application", dated May 20, 2022, with English translation thereof, p. 1-p. 12.
"International Search Report (Form PCT/ISA/210) of PCT/JP2019/049657," dated Feb. 18, 2020, with English translation thereof, pp. 1-4.

* cited by examiner

VIBRATION ISOLATION DEVICE WITH BRACKET

CROSS-REFERENCE TO RELATED APPLICATION

This application is a continuation application of and claims priority benefit of a 371 application of the International PCT application serial no. PCT/JP2019/049657, filed on Dec. 18, 2019, which claims the priority benefit of Japan Patent Application No. 2019-058920, filed on Mar. 26, 2019. The entirety of the above-mentioned patent applications is hereby incorporated by reference herein and made a part of this specification.

BACKGROUND

Technical Field

The present disclosure relates to a vibration isolation device with bracket, in which a vibration isolation device main body is assembled to a bracket from a transverse direction.

Related Art

Conventionally, a vibration isolation device used for an engine mount or the like is known. The vibration isolation device includes a vibration isolation device main body in which a first attachment member and a second attachment member are coupled by a main body rubber elastomer. In addition, the vibration isolation devices include a vibration isolation device in which a bracket is attached to a second attachment member of a vibration isolation device main body, and the second attachment member is attached to a vehicle body or the like via the bracket. As the vibration isolation device with bracket, for example, there is a vibration isolation device with bracket disclosed in Japanese Patent Laid-open No. 2017-214968 (Patent Literature 1).

Meanwhile, there is a vibration isolation device with bracket, in which fitting portions arranged on both sides in a width direction of a second attachment member are embedded to fitting grooves arranged on facing inner surfaces on both sides in a width direction of a bracket, and thereby a vibration isolation device main body is assembled to the bracket from a transverse direction. In this assembly structure of the vibration isolation device main body and the bracket, a holding structure for preventing removal of the vibration isolation device main body from the bracket may be arranged. In Patent Literature 1, an upper and lower biasing rubber is fastened to an upper surface of the fitting portions of the second attachment member, and meanwhile, a lock protrusion portion which protrudes in a protrusion dimension smaller than a thickness dimension of the biasing rubber is arranged on a lower surface of the fitting grooves of the bracket. Besides, when the fitting portions of the vibration isolation device main body cross the lock protrusion and is inserted in the fitting grooves of the bracket, the fitting portions are biased downward by elasticity of the upper and lower biasing rubber which is compressed between the fitting portions and the fitting grooves in an up-down direction. Consequently, displacement in the removal direction of the fitting portions with respect to the fitting grooves is limited by the lock protrusion portion.

LITERATURE OF RELATED ART

Patent Literature

Patent literature 1: Japanese Patent Laid-open No. 2017-214968

SUMMARY

Hereinafter, preferable aspects for understanding the present disclosure are described, but each aspect described below is an aspect which is exemplarily described and is capable of being used in appropriate combination with each other, and a plurality of constituent elements described in each aspect can be recognized and used as independently as possible, and also is capable of being used in appropriate combination with any of constituent elements described in another aspect. Thereby, in the present disclosure, various different aspects are capable of being achieved without being limited to the aspects described below.

A first aspect is a vibration isolation device with bracket, comprising a vibration isolation device main body in which a first attachment member and a second attachment member are coupled by a main body rubber elastomer, wherein fitting portions that are arranged on both sides in a width direction of a second attachment member are embedded to fitting grooves that are arranged on facing inner surfaces on both sides in a width direction of the bracket, and thereby the vibration isolation device main body is assembled to the bracket from a transverse direction. The second attachment member has a frame shape with a through hole, and the main body rubber elastomer is fastened to an upper surface side of the second attachment member. The main body rubber elastomer penetrates to a lower surface side of the second attachment member through an inner peripheral surface of the through hole. The vibration isolation device further includes a holding rubber and a fixed surface. The holding rubber is compressed in a state that the fitting portions being embedded to the fitting grooves and is formed integrally with the main body rubber elastomer on a lower surface of the fitting portions of the second attachment member. The fixed surface is arranged on an upper surface of the fitting portions of the second attachment member, wherein the fixed surface is exposed without being covered by the main body rubber elastomer, directly superimposed on an inner surface of the fitting grooves, and pressed and fixed by static friction to the inner surface of the fitting grooves by a compression reaction force of the holding rubber.

DESCRIPTION OF THE EMBODIMENTS

However, as a result of examination, the inventor found that there is still room for improvement of a holding force in a holding structure of Patent Literature 1. That is, in the holding structure of Patent Literature 1, a lower surface of fitting portions of a vibration isolation device main body is pressed to a lower surface of fitting grooves of a bracket by elasticity of an upper and lower biasing rubber, a movement of the vibration isolation device main body in a removal direction from the bracket is controlled by a static friction force obtained by a reaction force of the upper and lower biasing rubber. The inventors newly found that in the holding structure of Patent Literature 1, a separation distance from a first attachment member of the vibration isolation device main body to the lower surface of the fitting portions may become relatively large, and a generation moment may become large because of an external force which is input between the first attachment member and the lower surface of the fitting portions.

Furthermore, the inventors also newly found that a reaction force of a rubber member accommodated and held in the vibration isolation device main body may be input to the lower surface of the fitting portions of the vibration isolation device main body, and a fixing force obtained by the static friction force generated between contact surfaces of the lower surface of the fitting portions and the lower surface of the fitting grooves may be reduced.

The present disclosure has been made based on the above-mentioned new findings by the inventors, and a problem to be solved by the present disclosure is to provide a vibration isolation device with bracket having a structure, which improves a fixing force generated between facing surfaces of fitting portions and fitting grooves by an easy-to-produce structure.

According to one of the embodiments of the disclosure, on the lower surface of the fitting portions of the second attachment member, the holding rubber which is compressed in a state of being embedded to the fitting grooves is arranged, and the holding rubber is formed integrally with the main body rubber elastomer. Furthermore, on the upper surface of the fitting portions of the second attachment member, the fixed surface which is exposed without being covered by the main body rubber elastomer is arranged. Besides, the fixed surface is pressed and fixed by static friction with respect to the inner surface of the fitting grooves by the compression reaction force of the holding rubber. That is, the fixed surface which is fixed by static friction with respect to the inner surface of the fitting grooves is arranged on the upper surface of the fitting portions, and thus compared to a conventional structure in which the fixed surface is arranged on the lower surface of the fitting portions, a separation distance from the first attachment member of the vibration isolation device main body to the fixed surface is reduced. Consequently, the generation moment caused by the external force which is input between the first attachment member of the vibration isolation device main body and the fixed surface may become small, the fixing force generated between the facing surfaces of the fitting portions and the fitting grooves is improved, and stabilization of a fixed holding state of the second attachment member obtained by the bracket may be achieved.

Furthermore, the second attachment member has the frame shape with the through hole, and the main body rubber elastomer which is fastened to the upper surface side of the second attachment member penetrates to the lower surface side of the second attachment member through the inner peripheral surface of the through hole. Thereby, the holding rubber which is formed integrally with the main body rubber elastomer is easily arranged with respect to the lower surface of the fitting portions of the second attachment member. In particular, a path for the main body rubber elastomer to reach the lower surface of the fitting portions is ensured using the inner peripheral surface of the through hole of the second attachment member. Therefore, for example, compared to a case in which the main body rubber elastomer penetrates from the outer peripheral surface of the fitting portions to the lower surface of the fitting portions, a wall thickness of a connection part connecting the main body rubber elastomer and the holding rubber is capable of being set large, and a flow of a rubber material during molding is satisfactorily ensured.

Additionally, the holding rubber is arranged on the lower surface of the fitting portions, and the upper surface of the fitting portions is the fixed surface which is directly superimposed on the inner surface of the fitting grooves without being covered by other members and fixed by static friction with respect to the inner surface of the fitting grooves. Thereby, for example, even when the rubber member is accommodated and held in the vibration isolation device main body, it is avoided that the reaction force of the rubber member is applied to the fixed surface arranged on the upper surface of the fitting portions, and the fixing force generated by the static friction between the fixed surface of the fitting portions and the inner surface of the fitting grooves is stably ensured.

A second aspect is the vibration isolation device with bracket described in the first aspect, wherein the fixed surface exposed on the upper surface of the fitting portions of the second attachment member is arranged in a way of continuously extending over an entire length of the upper surface of the fitting portions in an embedding direction to the fitting grooves.

According to the vibration isolation device with bracket having a structure according to the aspect, the fixed surface configured by the upper surface which is exposed without being covered by other members in the fitting portions is arranged in a way of continuously extending over the entire length of the upper surface of the fitting portions in the embedding direction of the fitting portions to the fitting grooves. Thereby, the fixing force obtained by the static friction generated between contact surfaces of the fixed surface and the inner surface of the fitting grooves is ensured more stably. In addition, the fixed surface continuously extends over the entire length in the embedding direction to the fitting grooves, and thus an insertion of the fitting portions to the fitting grooves may be stably performed by a certain insertion force, and an improvement of operation efficiency is achieved.

A third aspect is the vibration isolation device with bracket described in the first aspect or the second aspect, wherein the main body rubber elastomer further penetrates to an outer peripheral surface from a lower surface of the second attachment member. The vibration isolation device further includes a lateral holding rubber which is compressed in a state of being embedded to the fitting grooves. The lateral holding rubber is formed integrally with the main body rubber elastomer on an outer peripheral surface of the fitting portions of the second attachment member.

According to the vibration isolation device with bracket having a structure according to the aspect, the lateral holding rubber is arranged on the outer peripheral surface of the fitting portions. Thereby, an error, which is between a dimension between end surfaces of the fitting portions on both sides in the width direction of the vibration isolation device main body and a dimension between bottom surfaces of the fitting grooves on both sides in the width direction of the bracket, is allowed by elastic deformation of the lateral holding rubber, and an assembly operation of the vibration isolation device main body and the bracket may be easily performed. Furthermore, the main body rubber elastomer further penetrates to the outer peripheral surface from the lower surface of the second attachment member, and thereby the lateral holding rubber is arranged integrally with the main body rubber elastomer on the outer peripheral surface of the fitting portions of the second attachment member. Thereby, a flow of a rubber material during molding of the lateral holding rubber may be satisfactorily ensured, and the lateral holding rubber which is arranged integrally with the main body rubber elastomer and has durability may be formed.

A fourth aspect is the vibration isolation device with bracket described in any one of the first aspect to the third aspect, the vibration isolation device further includes left and right guideways. In the fitting grooves arranged on the facing inner surfaces on both sides in the width direction of the bracket, the left and right guideways having an inclined shape are arranged on facing bottom surfaces of the fitting grooves on both sides, wherein the left and right guideways gradually expand toward a fitting opening side to which the fitting portions of the second attachment member are embedded.

According to the vibration isolation device with bracket having a structure according to the aspect, each bottom surface of the fitting grooves arranged on both sides in the width direction of the bracket has an inclined shape gradually expanding toward the fitting opening side, and thereby the left and right guideways are arranged. Thereby, when the fitting portions of the vibration isolation device main body are pressed into the fitting grooves of the bracket, two fitting portions is reliably centered to a central position between the fitting grooves in the width direction of the bracket. Consequently, a relative dimension variation between the fitting grooves and the fitting portions in the width direction of the bracket may be suppressed, and a press fitting operation may be smoothly performed.

A fifth aspect is the vibration isolation device with bracket described in any one of the first aspect to the fourth aspect, further includes upper and lower guideways. In the fitting grooves arranged on the facing inner surfaces on both sides in the width direction of the bracket, the upper and lower guideways having an inclined shape are arranged at a position where a region in which the holding rubber is pressed is deviated to the fitting opening side on at least one of upper and lower side-surfaces facing each other in a width direction of the grooves, wherein the upper and lower guideways gradually expand toward a fitting opening side to which the fitting portions of the second attachment member are embedded.

According to the vibration isolation device with bracket having a structure according to the aspect, in each fitting groove of the bracket, the upper and lower guideways are arranged on at least one of upper and lower side-surfaces facing each other in a width direction of the groove in the manner of having an inclined shape and gradually expanding toward the fitting opening side. Thereby, when the fitting portions of the vibration isolation device main body are pressed into the fitting grooves of the bracket, two fitting portions are reliably centered to a central position between the fitting grooves in an up-down direction of the bracket. Consequently, a relative dimension variation between the fitting grooves and the fitting portions in the up-down direction of the bracket is suppressed, and a press fitting operation may be smoothly performed. Moreover, the upper and lower guideways are arranged at the position where the region in which the holding rubber is pressed is deviated to the fitting opening side, and thus it may be avoided that a compression amount of the holding rubber after completion of the press fitting is affected by the upper and lower guideways. Consequently, the fixing force generated by the static friction based on the compression reaction force of the holding rubber may be maintained, and an improvement of the operation efficiency or an improvement of positioning stability of the bracket and the vibration isolation device main body may be achieved.

According to the present disclosure, a vibration isolation device with bracket is provided, which may improve a fixing force generated between facing surfaces of fitting portions and fitting grooves by an easy-to-produce structure.

Hereinafter, an embodiment of the present disclosure is described with reference to the drawings.

In FIGS. 1 to 8, as a first embodiment of a vibration isolation device with bracket according to the present disclosure, an engine mount 10 for automobile is shown. The engine mount 10 includes a mount main body 12 which is used as a vibration isolation device main body. In the following descriptions, in principle, an up-down direction is referred to as an up-down direction in FIG. 3 which is a central axis direction of a mount, a front-back direction is referred to as an orthogonal direction which is orthogonal to a paper surface in FIG. 3, and a left-right direction is referred to as a left-right direction in FIG. 3.

Figure 4:
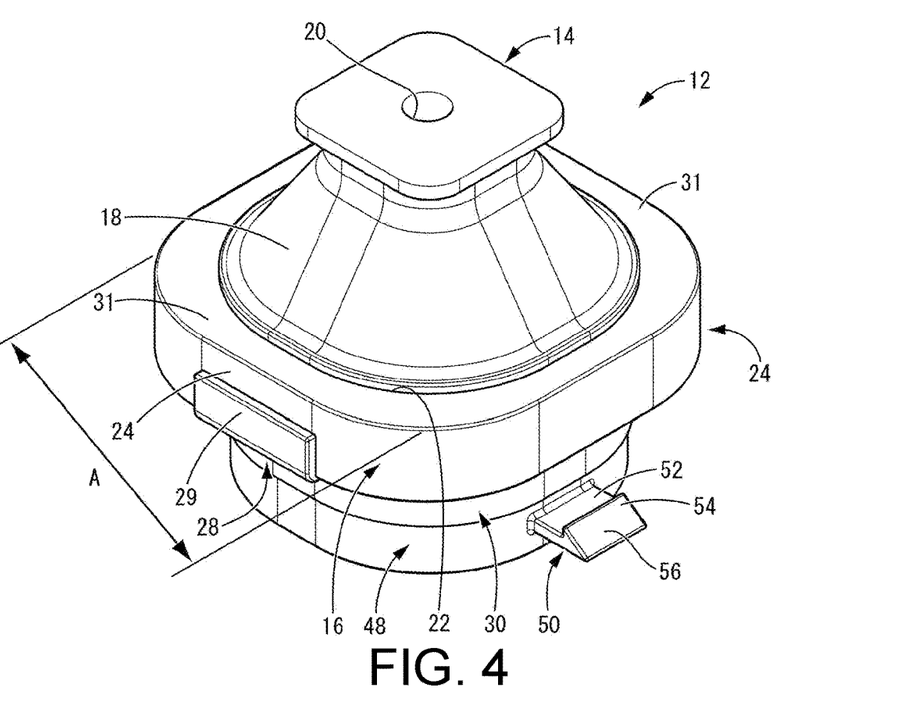
FIG. 4 is a perspective view of a mount main body which constitutes the engine mount shown in FIG. 1

In more detail, as shown in FIG. 4, the mount main body 12 has a structure in which a first attachment member 14 and a second attachment member 16 are coupled by a main body rubber elastomer 18.

Figure 5:
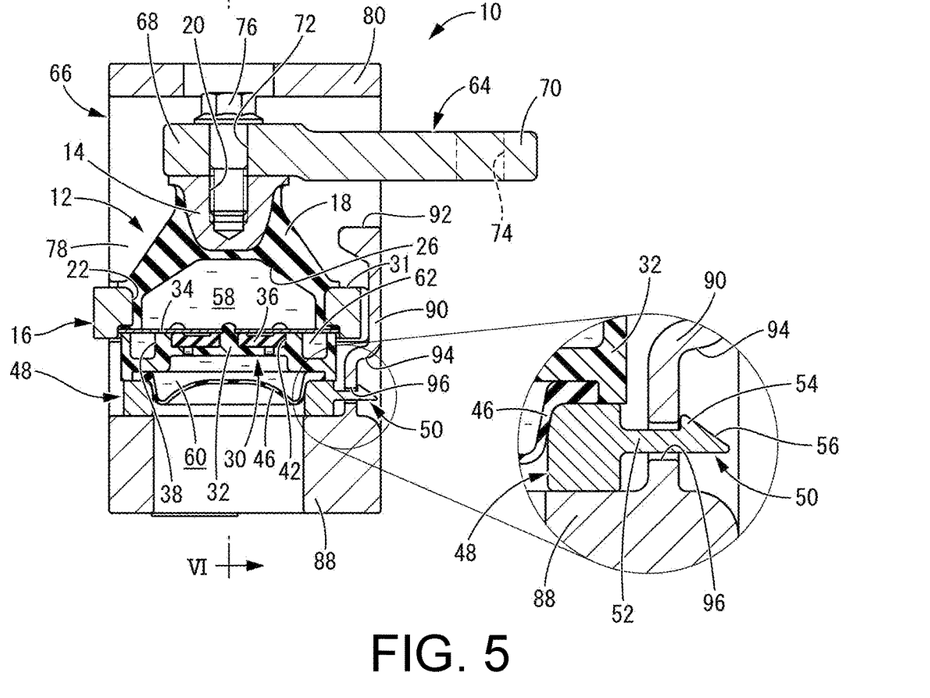
FIG. 5 is a V-V cross-sectional view of FIG. 3.
Figure 6:
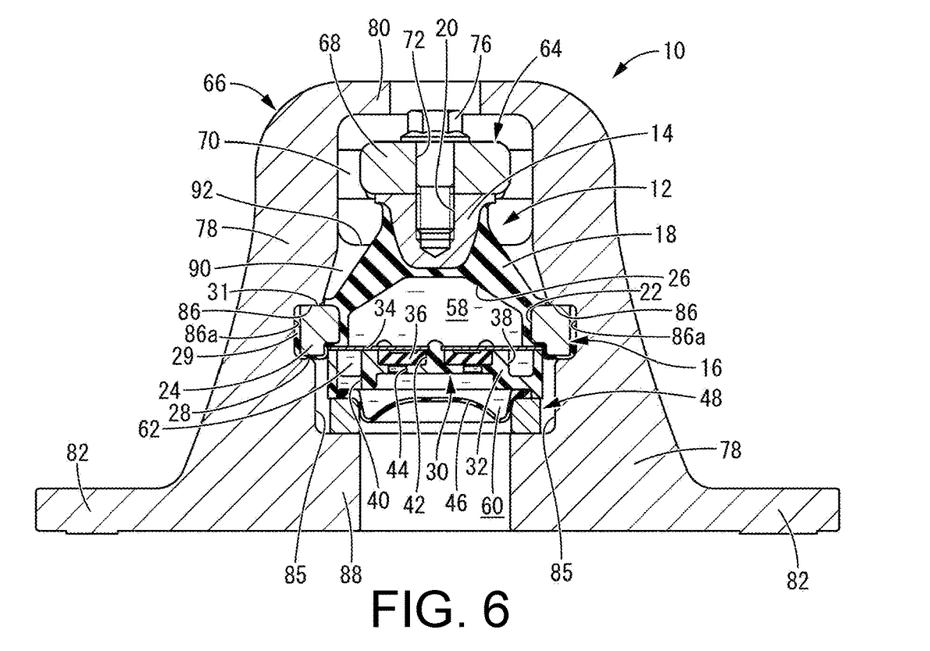
FIG. 6 is a VI-VI cross-sectional view of FIG. 5.

The first attachment member 14 is a high rigidity member formed by metal, synthetic resin, or the like, and has a solid circular block shape as shown in FIGS. 4 and 5. The first attachment member 14 has a small diameter downward. The first attachment member 14 has a screw hole 20 which opens on an upper surface and extends in the up-down direction.

The second attachment member 16 is a high rigidity member formed by metal, synthetic resin, or the like in the same manner as the first attachment member 14, and has a substantially rectangular frame shape with a through hole 22 in a central part. With regard to the second attachment member 16, an outer peripheral part protrudes downward and has an upper and lower dimension larger than an inner peripheral part. By the outer peripheral parts of the second attachment member 16 having a large upper and lower dimension on both sides in a width direction of the second attachment member 16 which is equivalent to the left-right direction in FIG. 3, a pair of fitting portions 24 embedded to a pair of fitting grooves 86 of an outer bracket 66 described later is configured.

The first attachment member 14 and the second attachment member 16 are separately disposed in an up-down direction on substantially the same central axis, and the main body rubber elastomer 18 is arranged between the first attachment member 14 and the second attachment member 16. The main body rubber elastomer 18 has a substantially truncated conical shape, the first attachment member 14 is fastened to an upper portion which is a small diameter side, and the second attachment member 16 is fastened to an outer peripheral surface of a lower portion which is a large diameter side. The main body rubber elastomer 18 is adhered by vulcanization to the first attachment member 14 and the second attachment member 16 during molding.

The main body rubber elastomer 18 includes a recessed portion 26 opening downward. The recessed portion 26 has a tapered shape in which an upper portion of a peripheral wall has a small diameter upward. The recessed portion 26 is formed, and thereby the main body rubber elastomer 18 has a tapered cross-sectional shape which is inclined to an outer periphery downward.

Figure 7:
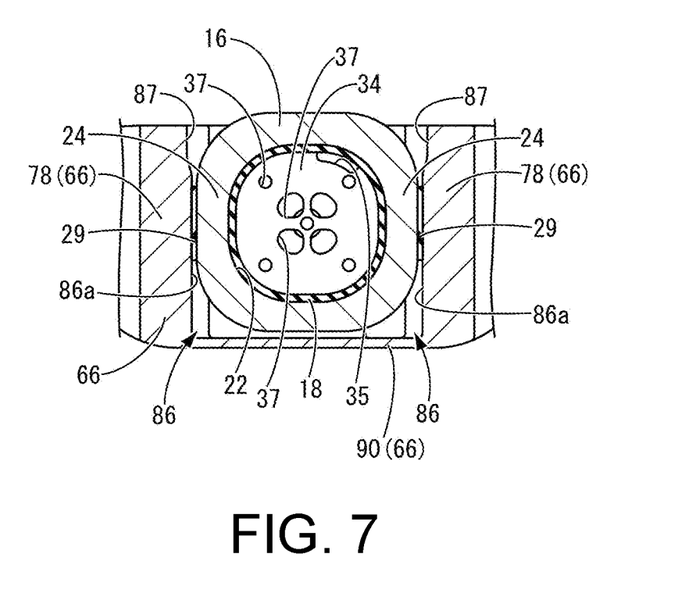
FIG. 7 is a VII-VII cross-sectional view of FIG. 3.

The outer peripheral surface of the lower portion which is the large diameter side of the main body rubber elastomer 18 is fastened in a way of straddling both an inner peripheral part of an upper surface of the second attachment member 16 and an inner peripheral surface of the second attachment member 16 which defines the through hole 22 (hereinafter referred to as the inner peripheral surface of the through hole 22). Furthermore, in the pair of fitting portions 24, 24 arranged on both sides in the width direction of the second attachment member 16, as shown in FIGS. 3, 4, 6, and 8, a holding rubber 28 and a lateral holding rubber 29, which are compressed in a state of being embedded to a fitting groove 86 described later, are respectively fastened to a lower surface and an outer peripheral surface of each fitting portion 24. The main body rubber elastomer 18 penetrates to a lower surface side of the second attachment member 16 through the inner peripheral surface of the through hole 22, and thereby the holding rubber 28 is formed integrally with the main body rubber elastomer 18. In addition, the main body rubber elastomer 18 further penetrates to an outer peripheral surface from a lower surface of the second attachment member 16, and thereby the lateral holding rubber 29 is formed integrally with the main body rubber elastomer 18. As shown in FIGS. 4 and 7, the holding rubber 28 and the lateral holding rubber 29 which are fastened to each fitting portion 24 are fastened to a central part of the second attachment member 16 in the front-back direction, and continuous with the main body rubber elastomer 18 on an outer peripheral side of the recessed portion 26 of the main body rubber elastomer 18 (see FIG. 6).

On the other hand, an upper surface of each fitting portion 24 is a fixed surface 31, on which the second attachment member 16 is directly exposed without being covered by a rubber member. As shown in FIG. 4, the fixed surface 31 arranged on the upper surface of each fitting portion 24 is arranged in a way of continuously extending over an entire length (A arrow part in FIG. 4) of the upper surface of the fitting portion 24 in an embedding direction of the fitting portion 24 to the fitting groove 86 described later.

A partition member 30 is attached to the second attachment member 16. The partition member 30 has a substantially disk shape as a whole, and has a structure in which a movable member 36 is placed between a partition member main body 32 and a lid member 34.

With regard to the partition member main body 32, a peripheral groove 38, which extends an outer peripheral part by a length less than a circle in a peripheral direction, is formed in a way of opening on an upper surface. On one end portion of the peripheral groove 38, a lower communication hole 40 penetrating through a lower wall portion of the peripheral groove 38 is formed. On an inner peripheral part of the partition member main body 32, an annular accommodation recess 42 is formed in a way of opening on the upper surface. On a lower wall portion of the accommodation recess 42, a plurality of lower through holes 44 are formed in a way of penetrating through the lower wall portion.

The lid member 34 has a thin-walled disk shape, and is superimposed and fixed on the upper surface of the partition member main body 32. On the lid member 34, an upper communication hole 35 is formed in a part covering the other end portion of the peripheral groove 38. On the lid member 34, a plurality of upper through holes 37 are formed in a part covering the accommodation recess 42.

In the accommodation recess 42 of the partition member main body 32, the movable member 36 is accommodated. The movable member 36 is a rubber elastomer having a substantially ring plate shape, and an inner peripheral end portion and an outer peripheral end portion respectively protrude toward an upper side and are thick-walled. Besides, in a state that the movable member 36 is put into the accommodation recess 42, the lid member 34 is fixed to the partition member main body 32, and thereby the movable member 36 is accommodated in the accommodation recess 42 between the partition member main body 32 and the lid member 34. With regard to the movable member 36, the inner peripheral end portion and the outer peripheral end portion which are thick-walled are clamped between the lid member 34 and the partition member main body 32 in the up-down direction, and elastic deformation in a thickness direction between the inner peripheral end portion and the outer peripheral end portion is allowed.

Below the partition member 30, a flexible membrane 46 formed by a thin-walled elastomer is arranged. With regard to the flexible membrane 46, an outer peripheral end portion is thick-walled, and is superimposed on a lower surface of the partition member main body 32. Besides, with respect to the outer peripheral end portion of the flexible membrane 46, a support member 48 having a frame shape is superimposed from below, and in a state that the mount main body 12 described later is mounted to the outer bracket 66, the outer peripheral end portion of the flexible membrane 46 is clamped between the partition member main body 32 and the support member 48.

Similar to the second attachment member 16, the support member 48 is a high rigidity member. With regard to the support member 48, in a state that the mount main body 12 described later is mounted to the outer bracket 66, an inner peripheral part clamps the flexible membrane 46, and an outer peripheral part comes into contact with the lower surface of the partition member main body 32. Thereby, the support member 48 is positioned with respect to the second attachment member 16 via the partition member main body 32.

In front of the support member 48, a locking portion 50 is arranged. As shown in FIGS. 4 and 5, the locking portion 50 has a structure in which a plate-shaped insertion portion 52 which extends out from a front surface of the support member 48 and a locking protrusion 54 which protrudes upward from the insertion portion 52 are formed integrally. A side-surface at the back of the locking protrusion 54 spreads substantially orthogonal to the front-back direction. A front end surface of the locking portion 50 is a guide inclined surface 56 which is inclined downward and forward. Thereby, a protruding front end part of the locking portion 50 gradually becomes thin-walled toward a front side which is a protruding front end side in the up-down direction.

The partition member 30 and the flexible membrane 46 are attached to the second attachment member 16 which constitutes an integrally vulcanized molded product of the main body rubber elastomer 18, and thereby a pressure receiving chamber 58 in which a part of a wall portion is configured by the main body rubber elastomer 18 is formed between the main body rubber elastomer 18 and the partition member 30. Furthermore, between the partition member 30 and the flexible membrane 46, an equilibrium chamber 60 in which a part of the wall portion is configured by the flexible membrane 46 is formed. In the pressure receiving chamber 58 and the equilibrium chamber 60, an uncompressed fluid is sealed. The uncompressed fluid is not particularly limited, for example, water, ethylene glycol, or the like is used. The uncompressed fluid may be a mixed liquid.

The pressure receiving chamber 58 and the equilibrium chamber 60 are communicated with each other by an orifice passage 62 including the peripheral groove 38. The orifice passage 62 extends an outer peripheral part of the partition member 30 in a peripheral direction, and two end portions are connected to each of the pressure receiving chamber 58 and the equilibrium chamber 60. Besides, if vibration in the up-down direction is input between the first attachment member 14 and the second attachment member 16, and an internal pressure difference between the pressure receiving chamber 58 and the equilibrium chamber 60 is generated, the flow of a fluid passing through the orifice passage 62 between the pressure receiving chamber 58 and the equilibrium chamber 60 will be generated, and vibration isolation effects such as a high damping function based on a flow behaviour of the fluid and the like will be obtained. With regard to the orifice passage 62, a tuning frequency which is a resonance frequency of a flowing fluid is adjusted to a frequency of vibration of a vibration isolation object according to a ratio of a cross-sectional area of the passage and a length of the passage, for example, is set to a low frequency of approximately 10 Hz which is equivalent to an engine shake.

Each of a liquid pressure of the pressure receiving chamber 58 and a liquid pressure of the equilibrium chamber 60 is applied to both upper and lower surfaces of the movable member 36 placed in the accommodation recess 42. Besides, if vibration in the up-down direction is input between the first attachment member 14 and the second attachment member 16, and an internal pressure difference between the pressure receiving chamber 58 and the equilibrium chamber 60 is generated, the movable member 36 will be elastically deformed in a thickness direction, and the liquid pressure of the pressure receiving chamber 58 will be transmitted to the equilibrium chamber 60 and released.

When vibration with low frequency and large amplitude is input, the flow of the fluid passing through the orifice passage 62 is actively generated in a resonance state, and vibration isolation effects by the high damping are obtained. When the vibration with low frequency and large amplitude is input, deformation of the movable member 36 is unable to follow, a function for releasing a liquid pressure by the deformation of the movable member 36 is not obtained, and thus the flow of the fluid passing through the orifice passage 62 is effectively generated. When vibration with medium to high frequency and small amplitude is input, the orifice passage 62 comes into a substantial clogged state by antiresonance. When the vibration with medium to high frequency and small amplitude is input, the movable member 36 is actively elastically deformed in a resonance state and releases a liquid pressure, and thereby vibration isolation effects by low-action spring performance are obtained.

An inner bracket 64 and the outer bracket 66 which is used as a bracket are attached to the mount main body 12.

The inner bracket 64 is a plate-shaped member and includes a coupling portion 68 which is superimposed on an upper surface of the first attachment member 14 and extends backward (rightward in FIG. 5), and an attachment portion 70 which is formed integrally behind the coupling portion 68. The coupling portion 68 includes a bolt hole 72 penetrating in the up-down direction in a part which is superimposed on the upper surface of the first attachment member 14. The attachment portion 70 includes a bolt hole 74, which protrudes to both left and right sides with respect to the coupling portion 68, and penetrates in the up-down direction. Besides, the coupling bolt 76 which is inserted into the bolt hole 72 of the coupling portion 68 is screwed to the screw hole 20 of the first attachment member 14, and thereby the inner bracket 64 is fixed to the first attachment member 14 and attached to the mount main body 12.

The outer bracket 66 includes a pair of legs 78, 78. The pair of legs 78, 78 respectively extends in the up-down direction, and is arranged in a way of facing each other in the left-right direction. Upper end portions of the pair of legs 78, 78 are coupled with each other by a top wall portion 80 which is formed integrally. On lower end portions of the pair of legs 78, 78, attachment pieces 82 protruding toward the outside in the left-right direction are respectively arranged, and a bolt hole 84 penetrating in the up-down direction is formed on each attachment piece 82 (see FIGS. 1 and 2).

Figure 3:
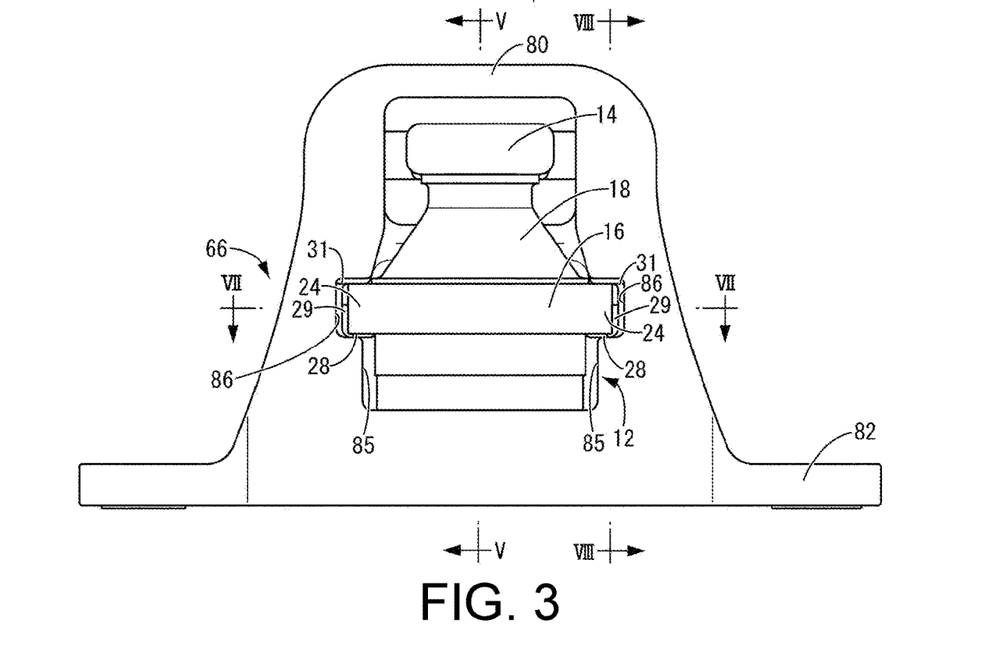
FIG. 3 is a front view of the engine mount shown in FIG. 1.

The pair of legs 78, 78 has facing inner surfaces 85, 85 facing each other in the left-right direction in FIG. 3 which is a width direction of the outer bracket 66 in FIG. 3, and includes the fitting grooves 86, 86 opening to the facing inner surfaces 85, 85. The pair of fitting grooves 86, 86 has facing bottom surfaces 86a, 86a facing each other in the width direction of the outer bracket 66. The fitting grooves 86, 86 extend in a straight line in the front-back direction, and one end portion thereof reaches a front end of the pair of legs 78, 78 (upward in FIG. 7), opens to the front surface, and constitutes a fitting opening to which the fitting portion 24 of the second attachment member 16 is embedded. In addition, the other end portion of the fitting grooves 86, 86 does not reach a back end of the pair of legs 78, 78 (downward in FIG. 7). The facing bottom surfaces 86a, 86a of the fitting grooves 86, 86 are equipped with left and right guideways 87, 87, which gradually expand toward a fitting opening side (upward in FIG. 7) to which the fitting portion 24 of the second attachment member 16 is embedded. That is, a corresponding direction distance of the facing bottom surfaces 86a, 86a of the fitting grooves 86, 86 which are arranged on both sides in the width direction of the outer bracket 66 gradually becomes larger toward the fitting opening side because of the left and right guideways 87, 87.

The left and right guideways 87, 87 are arranged on the end portion of the fitting opening side in a longitudinal direction of the fitting grooves 86, 86 (up-down direction in FIG. 7). A region in which lateral holding rubbers 29, 29 arranged on the fitting portions 24, 24 embedded to the fitting grooves 86, 86 are pressed with respect to the fitting grooves 86, 86 is arranged in a central part in the longitudinal direction of the fitting grooves 86, 86. Therefore, in the fitting grooves 86, 86, the left and right guideways 87, 87 are arranged in a separated position which is deviated further to the fitting opening side (upper side in FIG. 7) than the region in which the lateral holding rubbers 29, 29 are pressed.

In each fitting groove 86, on an upper side-surface which is one of upper and lower side-surfaces facing each other in the width direction of the groove (up-down direction in FIG. 8), upper and lower guideways 89 gradually expanding toward a fitting opening side of each fitting groove 86 (right side in FIG. 8) are arranged. That is, a groove width dimension of each fitting groove 86 gradually becomes larger toward the fitting opening side because of the upper and lower guideways 89. Moreover, the upper and lower guideways 89, 89 may be arranged on the lower side-surface, or may be arranged on both the upper side-surface and the lower side-surface.

Figure 8:
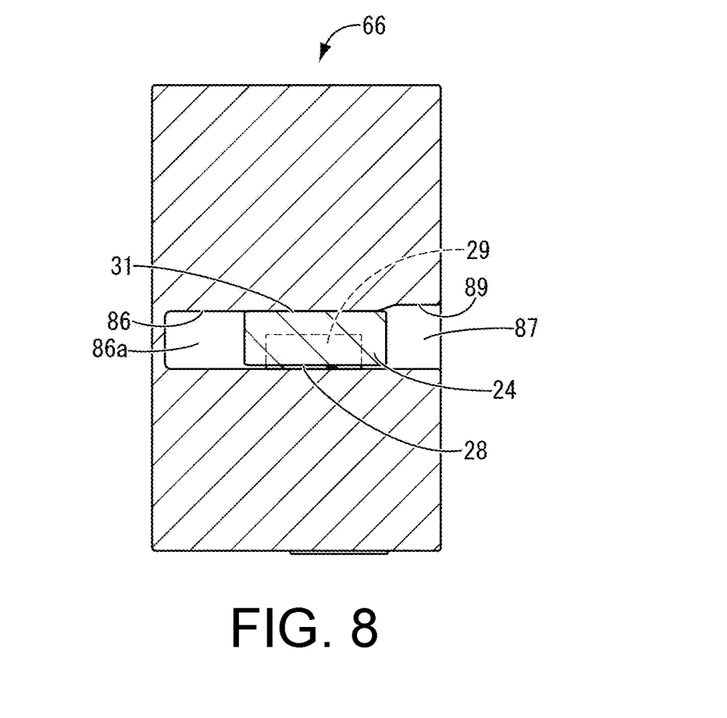
FIG. 8 is a VIII-VIII cross-sectional view of FIG. 3.

The upper and lower guideways 89, 89 are arranged on the end portion of the fitting opening side in the longitudinal direction of the fitting grooves 86, 86 (left-right direction in FIG. 8). A region in which the holding rubbers 28, 28 arranged on the fitting portions 24, 24 embedded to the fitting grooves 86, 86 are pressed with respect to the fitting grooves 86, 86 is arranged in the central part in the longitudinal direction of the fitting grooves 86, 86. Therefore, in the fitting grooves 86, 86, the upper and lower guideways 89, 89 are arranged in a separated position which is deviated further to the fitting opening side (right side in FIG. 8) than the region in which the holding rubbers 28, 28 are pressed.

On a side lower than the fitting grooves 86, 86 in the pair of legs 78, 78, a clamping portion 88 is arranged which protrudes toward an inner side in a facing direction of the pair of legs 78, 78. Parts on both left and right sides of the clamping portion 88 are connected to each other in the left-right direction on two ends in the front-back direction, and the clamping portion 88 has a tubular shape as a whole.

Figure 1:
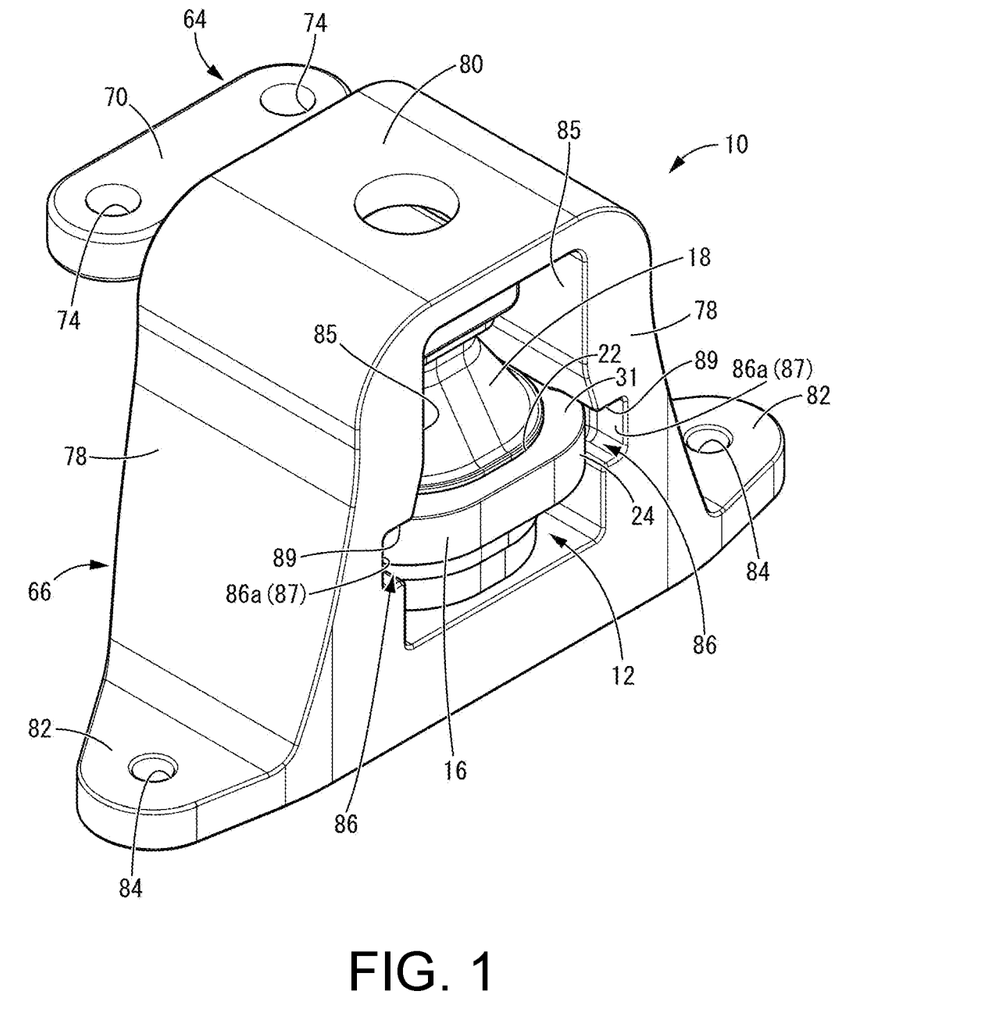
FIG. 1 is a perspective view showing an engine mount used as a first embodiment of the present disclosure.
Figure 2:
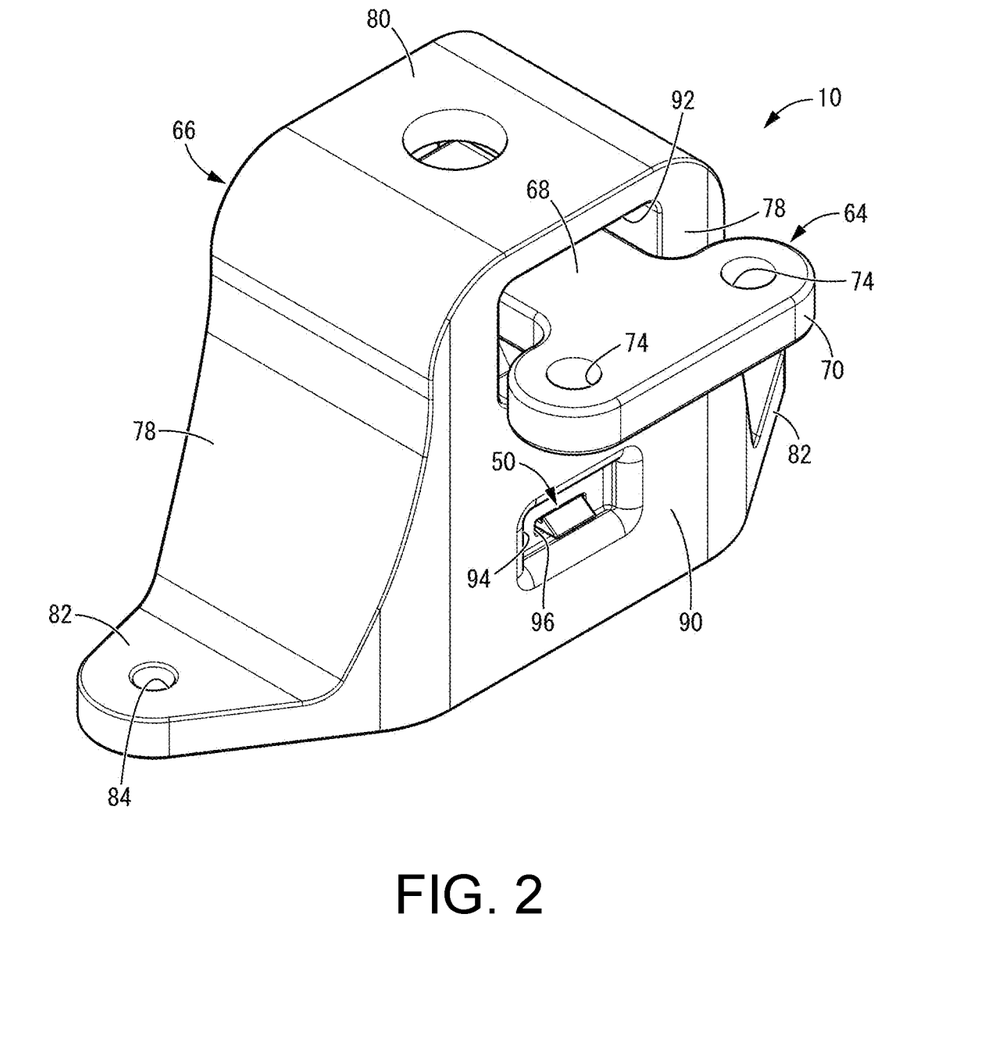
FIG. 2 is a perspective view showing the engine mount shown in FIG. 1 from another perspective.

In a back end part of the pair of legs 78, 78, an inner wall portion 90 is arranged. The inner wall portion 90 has a plate shape spreading in a crossing direction with respect to the front-back direction, and left and right end portions are connected to the pair of legs 78, 78. An upper end portion of the inner wall portion 90 is separated to a lower side with respect to the top wall portion 80, and an insertion hole 92 penetrating in the front-back direction is formed between the inner wall portion 90 and the top wall portion 80. In the inner wall portion 90, a recess 94 is formed. As shown in FIG. 2, the recess 94 is formed in a central part of the inner wall portion 90 in the left-right direction. The recess 94 opens to a surface of the inner wall portion 90 which is an outer surface with respect to a space in which the mount main body 12 is placed. A front and back depth dimension of the recess 94 is larger than a front and back dimension of a front end side from a back surface of the locking protrusion 54 of the locking portion 50 in the mount main body 12.

As shown in FIG. 5, in a bottom portion of the recess 94 in the inner wall portion 90, a locking hole 96 is formed. The locking hole 96 penetrates through the inner wall portion 90 in a forming part of the recess 94 in the front-back direction. The locking hole 96 has a hole cross-sectional shape substantially corresponding to a projection shape of the locking portion 50 of the mount main body 12 in the front-back direction.

The mount main body 12 is attached to the outer bracket 66. That is, the mount main body 12 is put and placed into a space surrounded by the pair of legs 78, 78 of the outer bracket 66, the top wall portion 80, and the clamping portion 88 from the front toward the back which is an assembly direction. At that time, with regard to the second attachment member 16 of the mount main body 12, as shown in FIG. 3, the fitting portions 24, 24 arranged on both sides in the width direction of the second attachment member 16 are embedded to the fitting grooves 86, 86 arranged on the facing inner surfaces 85, 85 on both sides in the width direction of the outer bracket 66. In addition, with regard to the second attachment member 16 of the mount main body 12, a lower surface of the support member 48 is superimposed on an upper surface of the clamping portion 88 of the outer bracket 66. Thereby, the second attachment member 16 is fixed to the outer bracket 66, and the mount main body 12 is assembled to the outer bracket 66 from a transverse direction substantially orthogonal to the up-down direction.

When the mount main body 12 is pressed into and assembled to the outer bracket 66 from the transverse direction, firstly, the fitting portions 24, 24 of the mount main body 12 are aligned and inserted into a fitting opening of the fitting grooves 86, 86 of the outer bracket 66. At this time, on the fitting opening of the fitting grooves 86, 86, the facing bottom surfaces 86a, 86a are equipped with the left and right guideways 87, 87 which have an inclined shape and gradually expand toward the fitting opening side. Therefore, in the width direction of the outer bracket 66, the fitting portions 24, 24 of the mount main body 12 may be reliably centered to a central position between the fitting grooves 86, 86 of the outer bracket 66. Consequently, a relative dimension variation between the fitting portions 24, 24 in the width direction of the outer bracket 66 and the fitting grooves 86, 86 may be suppressed, and a press fitting operation may be stably performed.

Furthermore, on the fitting opening of the fitting grooves 86, 86, the upper and lower guideways 89, 89 having an inclined shape gradually expanding toward the fitting opening side are arranged on an upper side-surface of upper and lower side-surfaces facing each other in the width direction of the fitting grooves 86, 86. Therefore, in the up-down direction of the outer bracket 66, the fitting portions 24, 24 of the mount main body 12 may be reliably centered to a central position between the fitting grooves 86, 86 of the outer bracket 66. Consequently, a relative dimension variation between the fitting portions 24, 24 in the up-down direction of the outer bracket 66 and the fitting grooves 86, 86 may be suppressed, and a press fitting operation may be stably performed.

The holding rubbers 28, 28 and the lateral holding rubbers 29, 29 are respectively fastened to the fitting portions 24, 24 of the second attachment member 16. In a state that an assembly of the mount main body 12 to the outer bracket 66 in the transverse direction is completed, the lower surface and the outer peripheral surface of the fitting portions 24, 24 are fitted to the fitting grooves 86, 86 via the holding rubbers 28, 28 and the lateral holding rubbers 29, 29. Thereby, in the longitudinal direction of the fitting grooves 86, 86 and the up-down direction, a bad fit caused by a dimension error of the fitting portions 24, 24 and the fitting grooves 86, 86 is avoided, and a variation of a necessary force for fit is reduced.

The fixed surfaces 31, 31 arranged on the upper surface of the fitting portions 24, 24 are surfaces by which the surface of the second attachment member 16 is exposed without being covered by a rubber member, and are pressed and fixed by static friction with respect to an upper side-surface of the fitting grooves 86, 86 by a compression reaction force of the holding rubbers 28, 28. In the embodiment, the fixed surfaces 31, 31 are arranged in a way of continuously extending over the entire length of the upper surface of the fitting portions 24, 24 in the embedding direction of the fitting portion 24 to the fitting grooves 86, 86, and thus a fixing force may be more stably ensured, the fixing force being obtained by a static friction force generated between contact surfaces of the fixed surfaces 31, 31 and the fitting grooves 86, 86 by the compression reaction force of the holding rubbers 28, 28.

In particular, the upper and lower guideways 89, 89 set in the fitting grooves 86, 86 are arranged at a position where a region in which the holding rubbers 28, 28 are pressed is deviated to the fitting opening side, and thus after completion of the assembly, a compression amount of the holding rubbers 28, 28 may be maintained without being affected by the upper and lower guideways 89, 89. Therefore, compatibility between an assurance of the fixing force generated by the static friction and an improvement of press fitting operation efficiency may be achieved.

On the second attachment member 16 which is fitted to the fitting grooves 86, 86 and the support member 48 which is superimposed on the upper surface of the clamping portion 88, forces in directions approaching each other in the up-down direction act. Thereby, the lower end portion of the main body rubber elastomer 18 is compressed in the up-down direction between the through hole 22 and the partition member 30, and the outer peripheral end portion of the flexible membrane 46 is compressed in the up-down direction between the partition member 30 and the support member 48. Thereby, fluid tightness in the wall portions of the pressure receiving chamber 58 and the equilibrium chamber 60 is improved, and problems such as liquid leakage and the like are avoided.

As shown in FIG. 5, the mount main body 12 is assembled to the outer bracket 66, and thereby the locking portion 50 arranged on the support member 48 of the mount main body 12 is inserted into the locking hole 96 formed in the inner wall portion 90 of the outer bracket 66. That is, with regard to the locking portion 50 arranged in a front end part of the mount main body 12 in an assembly direction to the outer bracket 66, the guide inclined surface 56 is pressed against an opening peripheral edge portion of the locking hole 96, and thereby the locking portion 50 bends elastically and is inserted into the locking hole 96. If the locking protrusion 54 of the locking portion 50 moves further to the front than the locking hole 96, pressing between a peripheral wall inner surface of the locking hole 96 and the locking protrusion 54 is released, the locking portion 50 returns to the initial shape, and the locking portion 50 is inserted into the locking hole 96 in the insertion portion 52.

The locking portion 50 which is inserted into the locking hole 96 and returns to the initial shape comes into a state in which an upper end portion of the locking protrusion 54 protrudes further to an upper side than an opening of the locking hole 96. Thereby, if the mount main body 12 attempts to move toward the back which is a removal direction opposed to the assembly direction with respect to the outer bracket 66, the locking protrusion 54 of the locking portion 50 will be locked to the opening peripheral edge portion of the locking hole 96, and return of the mount main body 12 toward the back with respect to the outer bracket 66 will be stopped. In this way, the locking portion 50 of the mount main body 12 is inserted and locked to the locking hole 96 of the outer bracket 66, and thereby a retaining mechanism is configured which prevents removal of the mount main body 12 from the outer bracket 66.

The retaining mechanism which prevents a separation of the mount main body 12 and the outer bracket 66 is arranged independently of an assembly structure of the mount main body 12 and the outer bracket 66 in which the fitting portions 24, 24 of the mount main body 12 are fitted to the fitting grooves 86, 86 of the outer bracket 66. Therefore, assembly strength of the mount main body 12 and the outer bracket 66 obtained by fit between the fitting portions 24, 24 and the fitting grooves 86, 86 may be sufficiently ensured, and the removal of the mount main body 12 from the outer bracket 66 may be stopped.

Moreover, with regard to the engine mount 10 in which the inner bracket 64 and the outer bracket 66 are mounted to the mount main body 12, for example, the inner bracket 64 is attached to an unshown power unit by unshown bolts which are inserted into the bolt holes 74, 74 of the attachment portion 70. The inner bracket 64 protrudes further to the front than the inner wall portion 90 of the outer bracket 66 through the insertion hole 92 of the outer bracket 66. In addition, with regard to the engine mount 10, for example, the outer bracket 66 is attached to an unshown vehicle body by unshown bolts which are inserted into the bolt holes 84, 84 of the attachment pieces 82, 82. Thereby, the power unit is coupled for vibration isolation with respect to the vehicle body via the engine mount 10.

In the engine mount 10 of the embodiment having the structure, the fixed surfaces 31, 31 which are fixed by static friction with respect to upper side-surfaces which are inner surfaces of the fitting grooves 86, 86 are arranged on upper surfaces of the fitting portions 24, 24, and thus compared to a conventional structure in which the fixed surfaces 31, 31 are arranged on lower surfaces of the fitting portions 24, 24, a separation distance from the first attachment member 14 of the mount main body 12 to the fixed surfaces 31, 31 may be reduced. Consequently, the generation moment caused by the external force which is input between the first attachment member 14 and the fixed surface 31 of the mount main body 12 may become small, and the fixing force generated between facing surfaces of the fitting portions 24, 24 and the fitting grooves 86 and 86 may be improved.

In addition, the second attachment member 16 has a rectangular frame shape with the through hole 22, and the main body rubber elastomer 18 penetrates to the lower surface side of the second attachment member 16 through the inner peripheral surface of the through hole 22, and thereby the holding rubbers 28, 28 which are formed integrally with the main body rubber elastomer 18 may be easily arranged with respect to the lower surface of the fitting portion 24 of the second attachment member 16, and satisfactory productivity may be achieved. In particular, the inner peripheral surface of the through hole 22 of the second attachment member 16 may be used to ensure a path from the main body rubber elastomer 18 to the lower surface of the fitting portion 24, and a wall thickness of a connection part connecting the main body rubber elastomer 18 and the holding rubbers 28, 28 may also be set large with satisfactory design flexibility. Consequently, a flow of a rubber material during molding may also be satisfactorily ensured, and production stability may also be obtained.

Furthermore, the holding rubber 28 is arranged on the lower surface of the fitting portion 24, and the upper surface of the fitting portion 24 is the fixed surface 31. Thereby, for example, it may be avoided that a reaction force of the rubber member such as the flexible membrane 46 accommodated and held in the mount main body 12 is applied to the fixed surface 31 arranged on the upper surface of the fitting portion 24. Consequently, the fixing force generated by the static friction between the fixed surface 31 of the fitting portion 24 and an inner surface of the fitting groove 86 may be stably ensured.

In addition, the main body rubber elastomer 18 further penetrates to the outer peripheral surface from the lower surface of the second attachment member 16, and thereby the lateral holding rubbers 29, 29 are arranged integrally with the main body rubber elastomer 18. Thereby, a flow of a rubber material during molding of the lateral holding rubbers 29, 29 may be satisfactorily ensured, and the lateral holding rubbers 29, 29 which are arranged integrally with the main body rubber elastomer 18 and have durability may be formed.

The embodiments of the present disclosure are described above in detail, but the present disclosure is not limited to the specific descriptions. For example, as the mount main body 12 which constitutes the engine mount 10 of the above embodiment, a fluid sealed vibration isolation device main body is described as an example, but the vibration isolation device main body is not limited to the vibration isolation device main body having a liquid sealing structure, and a solid type vibration isolation device main body such as a pressure receiving chamber, an equilibrium chamber, or the like which has no liquid sealing structure may also be used. In that case, effects of the present disclosure may also be obtained similarly. In addition, the present disclosure is not limited to a structure in which seal of the pressure receiving chamber and the equilibrium chamber is completed by an assembly of a vibration isolation device main body to a bracket, and the seal may be completed in a state of the single vibration isolation device main body before attachment to the bracket.

The fixed surfaces 31, 31 arranged on the upper surfaces of the fitting portions 24, 24 of the mount main body 12 are not necessary to continuously extend over an entire length in an embedding direction to the fitting grooves 86, 86, and may be arranged over a predetermined length, or arranged in a plurality of locations which are divided in the embedding direction.

The fixed surfaces 31, 31 arranged on the upper surfaces of the fitting portions 24, 24 of the mount main body 12 may be surfaces by which the surface of the second attachment member 16 which constitutes the fitting portions 24, 24 is exposed without being covered by a rubber member or the like, and fixed surfaces exposed by removing rubber burr or the like generated in the fitting portion 24 during molding of the mount main body 12 are definitely also included in the scope of the claims of the present disclosure.

In the embodiments described above, the lateral holding rubber 29 which is formed integrally with the main body rubber elastomer 18 is fastened to the outer peripheral surface of each fitting portion 24, but the lateral holding rubber 29 is not necessarily arranged, and the main body rubber elastomer 18 may be arranged separately.

In corresponding sections of the fixed surface 31 of at least one of the fitting portions 24, 24 of the second attachment member 16 and the inner surface of the fitting groove 86 to which the fixed surface 31 is pressed, a safety mechanism may be arranged which stops return toward a direction opposed to an assembly direction of the second attachment member 16 to the outer bracket 66 by a concavo-convex engagement structure. The concavo-convex engagement structure is arranged in the region where the fixed surface 31 is directly superimposed on the inner surface of the fitting groove 86 without using a rubber member so that a state of tight connection is maintained and the fixed surface 31 is fixed by static friction, and thereby the removal of the mount main body 12 from the outer bracket 66 may be more reliably stopped.

What is claimed is:

1. A vibration isolation device with bracket, comprising a vibration isolation device main body in which a first attachment member and a second attachment member are coupled by a main body rubber elastomer, wherein fitting portions that are arranged on both sides in a width direction of a second attachment member are embedded to fitting grooves that are arranged on facing inner surfaces on both sides in a width direction of the bracket, and thereby the vibration isolation device main body is assembled to the bracket from a transverse direction, wherein the second attachment member has a frame shape with a through hole, and the main body rubber elastomer is fastened to an upper surface side of the second attachment member; and wherein the main body rubber elastomer penetrates to a lower surface side of the second attachment member through an inner peripheral surface of the through hole, and wherein the vibration isolation device further comprises:
a holding rubber, which is formed integrally with the main body rubber elastomer on a lower surface of the fitting portions of the second attachment member, is compressed in a state that the fitting portions being embedded to the fitting grooves;
a fixed surface which is arranged on an upper surface of the fitting portions of the second attachment member, wherein the fixed surface is exposed without being covered by the main body rubber elastomer, directly superimposed on an inner surface of the fitting grooves, and pressed and fixed by static friction to the inner surface of the fitting grooves by a compression reaction force of the holding rubber; and
left and right guideways, wherein in the fitting grooves arranged on the facing inner surfaces on both sides in the width direction of the bracket, the left and right guideways having an inclined shape are arranged on facing bottom surfaces of the fitting grooves on both sides, and the left and right guideways gradually expand toward a fitting opening side to which the fitting portions of the second attachment member are embedded.

2. The vibration isolation device with bracket according to claim 1, wherein the fixed surface exposed on the upper surface of the fitting portions of the second attachment member is arranged in a way of continuously extending over an entire length of the upper surface of the fitting portions in an embedding direction to the fitting grooves.

3. The vibration isolation device with bracket according to claim 1, wherein the main body rubber elastomer further penetrates to an outer peripheral surface from a lower surface of the second attachment member, and wherein the vibration isolation device further comprises a lateral holding rubber which is compressed in a state that the fitting portions being embedded to the fitting grooves, the lateral holding rubber is formed integrally with the main body rubber elastomer on an outer peripheral surface of the fitting portions of the second attachment member.

4. A vibration isolation device with bracket, comprising a vibration isolation device main body in which a first attachment member and a second attachment member are coupled by a main body rubber elastomer, wherein fitting portions that are arranged on both sides in a width direction of a second attachment member are embedded to fitting grooves that are arranged on facing inner surfaces on both sides in a width direction of the bracket, and thereby the vibration isolation device main body is assembled to the bracket from a transverse direction, wherein the second attachment member has a frame shape with a through hole, and the main body rubber elastomer is fastened to an upper surface side of the second attachment member; and wherein the main body rubber elastomer penetrates to a lower surface side of the second attachment member through an inner peripheral surface of the through hole, and wherein the vibration isolation device further comprises:
a holding rubber, which is formed integrally with the main body rubber elastomer on a lower surface of the fitting portions of the second attachment member, is compressed in a state that the fitting portions being embedded to the fitting grooves;
a fixed surface which is arranged on an upper surface of the fitting portions of the second attachment member, wherein the fixed surface is exposed without being covered by the main body rubber elastomer, directly superimposed on an inner surface of the fitting grooves, and pressed and fixed by static friction to the inner surface of the fitting grooves by a compression reaction force of the holding rubber; and upper and lower guideways, wherein in the fitting grooves arranged on the facing inner surfaces on both sides in the width direction of the bracket, the upper and lower guideways having an inclined shape are arranged at a position where a pressed region of the upper and lower guideways in which the holding rubber is pressed is other than a fitting opening side on at least one of upper and lower side-surfaces facing each other in a width direction of the groove, wherein the upper and lower guideways gradually expand toward the fitting opening side to which the fitting portions of the second attachment member are embedded.

* * * * *